US007111249B2

(12) United States Patent
Kenyon

(10) Patent No.: US 7,111,249 B2
(45) Date of Patent: Sep. 19, 2006

(54) COMMUNICATION AND/OR TRANSACTION WITH CLIENT THROUGH ACTIVE MANAGEMENT OF A CLIENT MENU HIERARCHY

(75) Inventor: Jeremy A. Kenyon, Kirkland, WA (US)

(73) Assignee: WildTangent, Inc., Redmond, WA (US)

( * ) Notice: Subject to any disclaimer, the term of this patent is extended or adjusted under 35 U.S.C. 154(b) by 888 days.

(21) Appl. No.: 09/901,560

(22) Filed: Jul. 9, 2001

(65) Prior Publication Data

US 2003/0187912 A1 Oct. 2, 2003

(51) Int. Cl.
*G06F 17/00* (2006.01)
*G06F 9/445* (2006.01)
*G06F 9/44* (2006.01)

(52) U.S. Cl. ...................... 715/825; 715/841; 715/861; 717/174; 717/168

(58) Field of Classification Search ........ 717/101–103, 717/105, 123, 120–121, 174, 168; 709/200, 709/203, 223, 224; 715/734, 736, 738, 744, 715/783, 821, 824–826, 828, 841, 844, 853, 715/859, 861, 512, 514, 526
See application file for complete search history.

(56) References Cited

U.S. PATENT DOCUMENTS

| | | | | |
|---|---|---|---|---|
| 4,823,283 | A * | 4/1989 | Diehm et al. | 715/825 |
| 5,784,583 | A | 7/1998 | Redpath | |
| 6,023,267 | A * | 2/2000 | Chapuis et al. | 715/810 |
| 6,138,157 | A * | 10/2000 | Welter et al. | 709/224 |
| 6,314,570 | B1 * | 11/2001 | Tanigawa et al. | 725/40 |
| 6,411,337 | B1 | 6/2002 | Cove et al. | |
| 6,466,241 | B1 * | 10/2002 | Schindler | 715/854 |
| 6,915,451 | B1 * | 7/2005 | Fitzgerald et al. | 714/20 |
| 2002/0075312 | A1 | 6/2002 | Amadio et al. | |
| 2002/0080771 | A1 * | 6/2002 | Krumel | 370/352 |

* cited by examiner

*Primary Examiner*—Antony Nguyen-Ba
(74) *Attorney, Agent, or Firm*—Schwabe, Williamson & Wyatt, P.C.

(57) ABSTRACT

A sub-menu item is added to a menu item of a menu hierarchy to make available, offer or otherwise communicate the availability of a new version of a resource or a resource of like kind to a user. Visual representation of the menu item is changed from a first state to a second state to draw a user's attention to the addition of the sub-menu item. The visual representation of the menu item is subsequently restored back to the first state, responsive to an occurrence of a predetermined condition, such as selection of the sub-menu item by the user.

36 Claims, 11 Drawing Sheets

200

Note: (1) Sub-menu items correspond to resources, which may be executables, text files, web pages and the like.

Note: (1) Sub-menu items correspond to resources, which may be executables, text files, web pages and the like.

COMMUNICATION AND/OR TRANSACTION WITH CLIENT THROUGH ACTIVE MANAGEMENT OF A CLIENT MENU HIERARCHY

BACKGROUND OF THE INVENTION

1. Field of the Invention

The present invention relates to the field of data processing. More specifically, the present invention relates to methodologies associated with communicating and/or transacting with clients.

2. Background Information

With advances in microprocessor, networking and telecommunication technologies, increasingly computing devices are networked together through private and public networks, such as the Internet. As a result, increasingly, software, content as well as service providers desire to communicate and/or transact with their clients online directly.

Examples of such desired communication and/or transactions include but are not limited to

- an airline offering special airfares
- an online retailer announcing special sales
- a content provider announcing availability of new contents
- an online application service provider or a software distributor announcing service bulletins, new functions, and/or new products.

Under the prior art, many of these announcements and/or offerings are made "passively", e.g. on the provider's home page. The "passive" approach has the desired characteristic of being "non-intrusive", i.e. the user's routine operations are not intruded upon, until the user connects to the provider's web site. However, the approach suffers from the obvious disadvantage of being "passive", i.e. the user is not alerted of the announcement or offering until the user connects to the provider's site. Further, the approach is "non-persistent", i.e. once the user accesses another page, the announcement or offering is no longer available to the user.

Alternatively, under the prior art, some announcements or offerings are made in more "active" or "assertive" manners. For examples, some announcements or offerings are made via "pushed" emails, user prompts (when a user logs in for online services), highlighting a program product and/or content offering's own icon (upon detecting the user being online), and so forth. While these more "active" or "assertive" approaches may be able to alert the user more effectively, they all tend to have the disadvantage of being intrusive, i.e. disrupting the user's routine online operation (requiring the user to at a minimum "cancel" the notification if the user elects not to accept the offering at the time, e.g. canceling an "upgrade available notice" if elected not to upgrade at the moment). Further, many also lack the desired characteristic of "persistency". That is, once the user "cancels", the announcement or offering is "gone", until the reoccurrence of the triggering event, causing the intrusive announcement or offering to be made again.

Accordingly, an improved approach to communicate and/or transact with clients is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a more effective approach to communicating and/or transacting with a client through active management of a menu hierarchy on a client, that is more relatively more persistent and less intrusive to the client.

In the description to follow, various aspects of the present invention will be described. However, the present invention may be practiced with only some of aspects described. For purposes of explanation, specific numbers, materials and configurations are set forth each of these aspects in order to provide a thorough understanding. However, each of these aspects may be practiced without the specific details. In other instances, well known features are omitted or simplified in order not to obscure the present invention.

Parts of the description will be presented in terms of operations performed by a processor based device, using terms such as menu items, sub-menu items, resources, determining, adding, changing, and the like, consistent with the manner commonly employed by those skilled in the art to convey the substance of their work to others skilled in the art. These quantities take the form of electrical, magnetic, or optical signals, and the operations involve storing, transferring, combining, and otherwise manipulating through electrical and/or mechanical components of the processor based device. The term processor include microprocessors, microcontrollers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Figure 1:
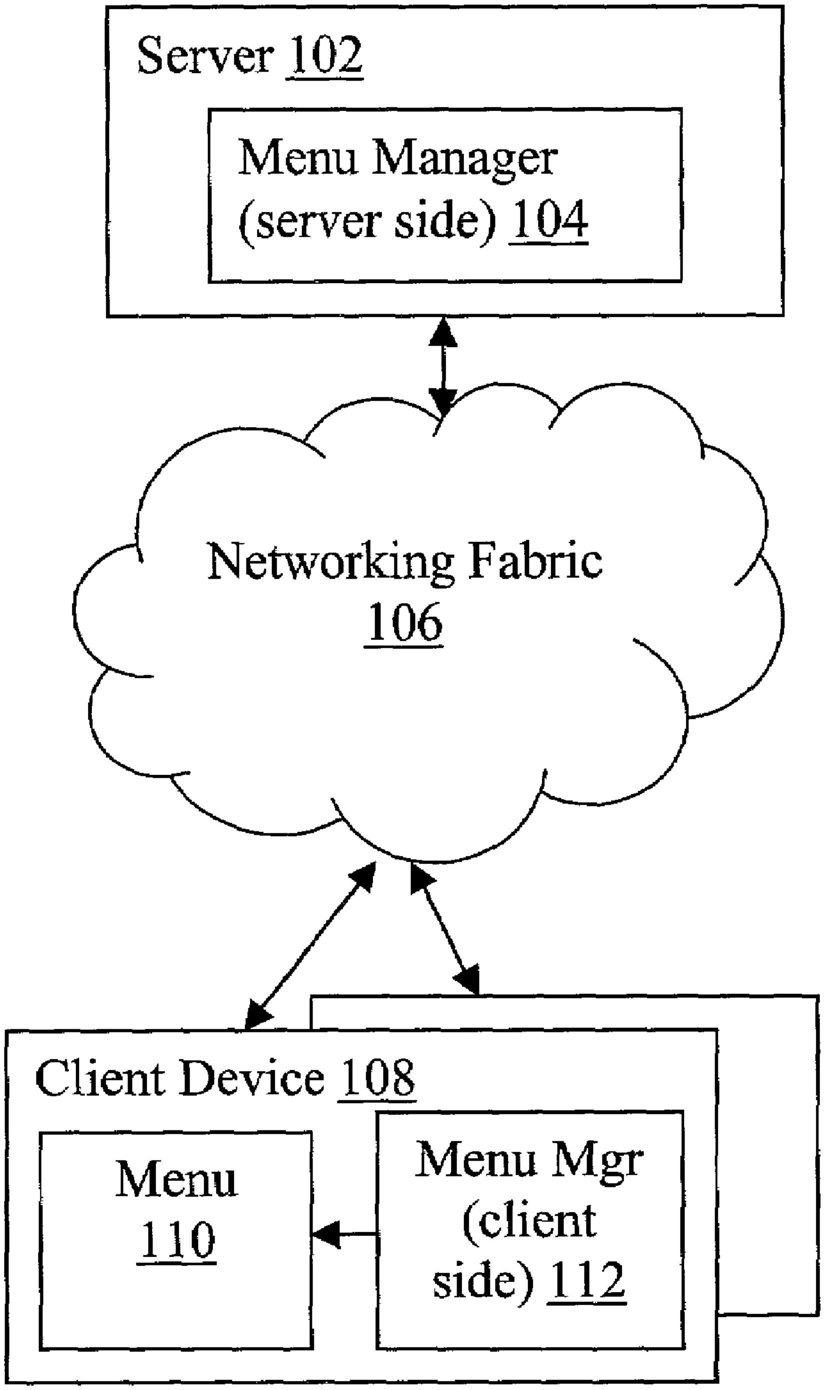
FIG. 1 illustrates a network view of the present invention, in accordance with one embodiment.
Figure 2:
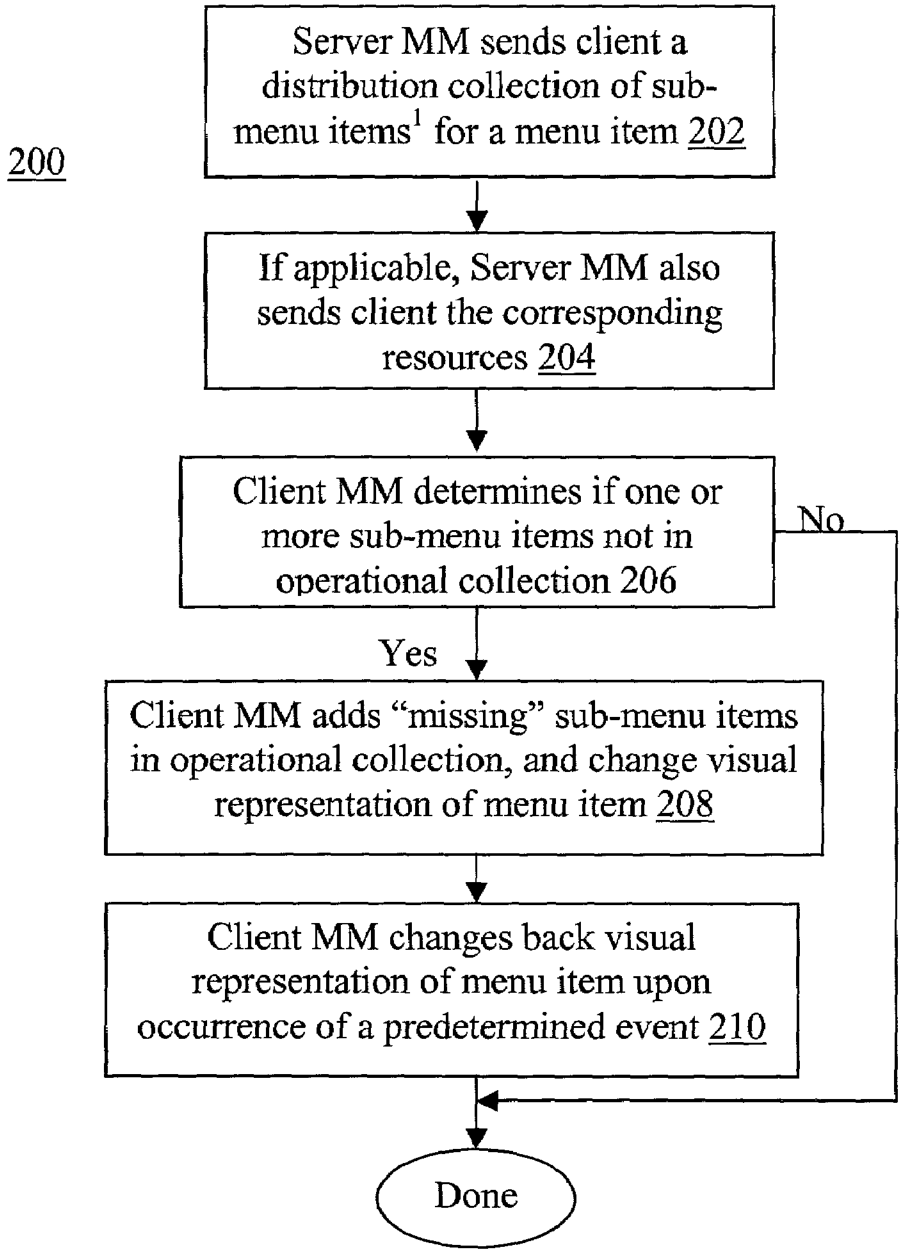
FIG. 2 illustrates a method view of the present invention, including operational flows of the relevant aspects of the menu managers (server and client side) of FIG. 1, in accordance with one embodiment.

Referring now to FIGS. 1–2, wherein two diagrams illustrating a network view and a method view of the present invention, in accordance with one embodiment, are shown. As illustrated in FIG. 1, in accordance with the present invention, a software, content or service provider (hereinafter, simply provider), through its computing equipment, such as server 102, communicates or transacts with its clients, such as client 108, through active management of a menu hierarchy, such as menu 110, of client 108. That is, for the present invention, each of clients 108 is assumed to include a graphical end user interface that includes menu hierarchies (see e.g. FIG. 3*a*), and underlying operating system services in support of such graphical end user interface. One example of such clients is a computing device equipped with one of the versions of the Windows® Operating System available from Microsoft Corporation of Redmond, Wash.

For the illustrated embodiment, server 102 and client 108 are equipped with the server and client side versions of menu manager 104 and 112 of the present invention respectively. Together, menu managers 104 and 112 effectuate the desired persistent but relatively less intrusive manner of communication and/or transaction between provider of server 102 and its clients 108, through active management of at least one each of the menu hierarchies of clients 108, to be described more fully below.

Server 102 and clients 108 are coupled to each other through network fabric 106. Server 102 represents a broad range of server computing devices known in the art, including but are not limited to those available from manufacturers such as IBM of Armonk, N.Y., and Sun Microsystems of Menlo Park, Calif. Similarly, except for the earlier mentioned assumed inclusion of a graphical user interface that includes menu hierarchies and the underlying operating system services in support of such graphical user interface, clients 108 also represent a broad range of computing devices known in the art, including but are not limited to wireless mobile phones, palm sized personal digital assistants, notebook computers, desktop computers and set top boxes. Network fabric 106 represents a broad range of private and/or public networks or interconnected networks, such as the Internet.

Server 102 communicates or transacts with their clients 108 using a selected one of the messaging and communication protocols known in the art. Examples of such messaging and communication protocols include but are not limited to the Hypertext Transmission Protocol (HTTP) and the Transmission Control Protocol/Internet Protocol (TCP/IP).

The types of communications and/or transactions that may be effectuated persistently, but relatively non-intrusive, through the present invention, include but are not limited to

- software, content and/or service providers making available or offering updates, new versions and/or new like kind of software, content and/or services to their clients;
- software and/or service providers communicating service bulletins to their clients;
- collaboration applications making available and/or announcing the availability of updates to, new versions of and/or new like kind of shared resources to their clients. An example of a shared resource is a shared document.

Hereinafter, unless the context requires (such as usage in the collaboration context above), usage of the term "resource" shall be broadly construed to include executables, text files, audio files, video files, multi-media files, web pages and the like.

Referring now more specifically to FIG. 2, in accordance with the present invention, a provider, through its server 102, more specifically, its menu manager 104, initiates a communication or transaction with one of its clients 108 by sending to the client, more specifically, its menu manager 112, a distribution collection of sub-menu items for a menu item, block 202. For the illustrated embodiment, menu manager 104 also provides menu manager 112 with the visual representations of the sub-menu items, and a temporal substitute visual representation of the menu item. The menu item may be located at any level of the menu hierarchy, and the sub-menu items are by definitions "child" menu items at the next level. Thus, a menu item may in and of itself is a sub-menu item of another "parent" menu item.

The sub-menu items correspond to the resources that are objects of the communication or transaction. In one embodiment, the resources are 3D games, their trial out versions, or announcements about the 3D games; and the sub-menu items are locators identifying the storage locations of the 3D games or their trial out versions or their announcements. The visual representations of the sub-menu items are titles of the 3D games. The storage locations identified by the locators may be file storage locations within a file subsystem of the client, or storage locations remotely disposed away from the client. An example of the locator of the former type is an access path to the file storage location, and an example of the locator of the latter type is a uniform resource locator (URL).

In one embodiment, the provider, more specifically, menu manager 104 of server 102 initiates the transmission of the distribution collection and the companion visual representations, in response to a client 108 checking in with server 102. Such periodic check-in capability may be pre-provided to a client 108, as an integral part of the initial installation of the product, content and/or agent for accessing the services of the provider of server 102. In another embodiment, the provider, more specifically, menu manager 104 of server 102 initiates the transmission of the distribution collection and the companion visual representations to known clients on a periodic basis. The client lists may for example be established through a registration process, registering users of provider's product, content or service. In yet other embodiments, the present invention may be practiced with other communication or transaction initiation conditions.

Continuing to refer particularly to FIG. 2, for applications where the sub-menu items refer to storage locations within a file subsystem of the client, menu manager 104 of server 102 also transmits the resources to the client 108, block 204.

Upon receipt of the distribution collection of sub-menu items, the associated visual representations, and optionally, the resources itself, menu manger 112 of the receiving client 108 determines if one or more of the sub-menu items are not part of the operational collection of the sub-menu items of the menu item, block 206. In one embodiment, the operational collection is menu "entity" utilized by the underlying operating system in determining the current content of the particular menu hierarchy.

If all sub-menu items of the distribution collection are part of the operational collection, the operational collection is considered to be current, and menu manager 112 takes no further action.

However, if one or more sub-menu items of the distribution collection are not part of the operational collection, menu manager 112 adds the "missing" (new) submenu items to the operational collection, block 208. For the illustrated embodiment, menu manager 112 further temporarily changes the visual representation of the menu item from its current visual representation (first state), which is typically its "normal" visual representation, to the temporal replacement visual representation provided (second state), block 208. The temporal visual representation is employed to draw the users attention to the fact that "new" sub-menu items have been added for the menu item.

Accordingly, when the user drawn by the temporal visual representation, selects the menu item, the "new" sub-menu items become visible to the user. However, the "new" sub-menu items are "hidden" from the user if the user elects to ignore the transformation of the visual representation of the menu items, and proceeds with his or her desire navigation of the menu hierarchy. Thus, the desired relatively non-intrusive attribute is achieved.

Further, until the "added" sub-menu items are "removed" (to be described more fully below), the "added" sub-menu items remain visible to the user whenever the menu item is selected. Accordingly, the desired persistency attribute is also advantageously achieved.

For the illustrated embodiment, menu manager 112 further subsequently restores the visual representation of the menu item back to its "normal" state (i.e. from the earlier mentioned second state back to the first state), upon occurrence of a predetermined event 210. The predetermined event is application dependent.

In one embodiment, menu manager 112 restores the visual representation of the menu item back to its "normal" state after the user has accepted the offer extended by the "new" sub-menu item or items, or acted upon the information provided by the "new" sub-menu item or items. In an alternate embodiment, menu manager 112 restores the visual representation of the menu item back to its "normal" state after a predetermined threshold number of the "added" sub-menu items have been selected, regardless whether the user has accepted any of the offers extended or acted upon any of the information provided. In yet another embodiment, menu manager 112 restores the visual representation of the menu item back to its "normal" state after a predetermined period of elapsed time.

In various embodiments, as part of the process of restoring the visual representation of the menu item back to its "normal" state, menu manager 112 may also remove any of the "added" sub-menu items not accepted, not acted upon or not selected by the user. In a preferred practice of the present invention, disposition of the "added" sub-menu items are also addressed as part of the "acceptance" process when the offer extended or information provided is acted upon by the user.

Referring now to FIGS. 3*a*–3*b* through 6*a*–6*b*, wherein eight block diagrams illustrating four example applications of the present invention, are shown. As will be readily apparent from the description to follow, these are exemplary illustrations, and the present invention may be practiced with product, content and/or service provision, offering, and/or announcement.

Figure 3A:
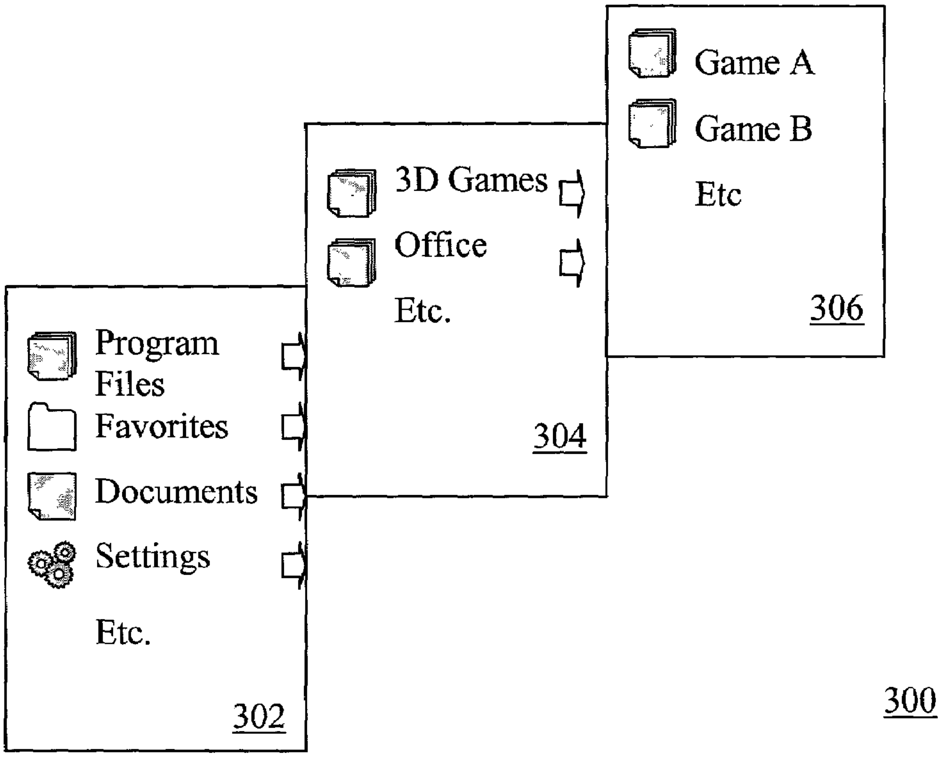
FIGS. 3*a*–3*b* illustrate an end user view of the present invention, in accordance with one application.
Figure 3B:
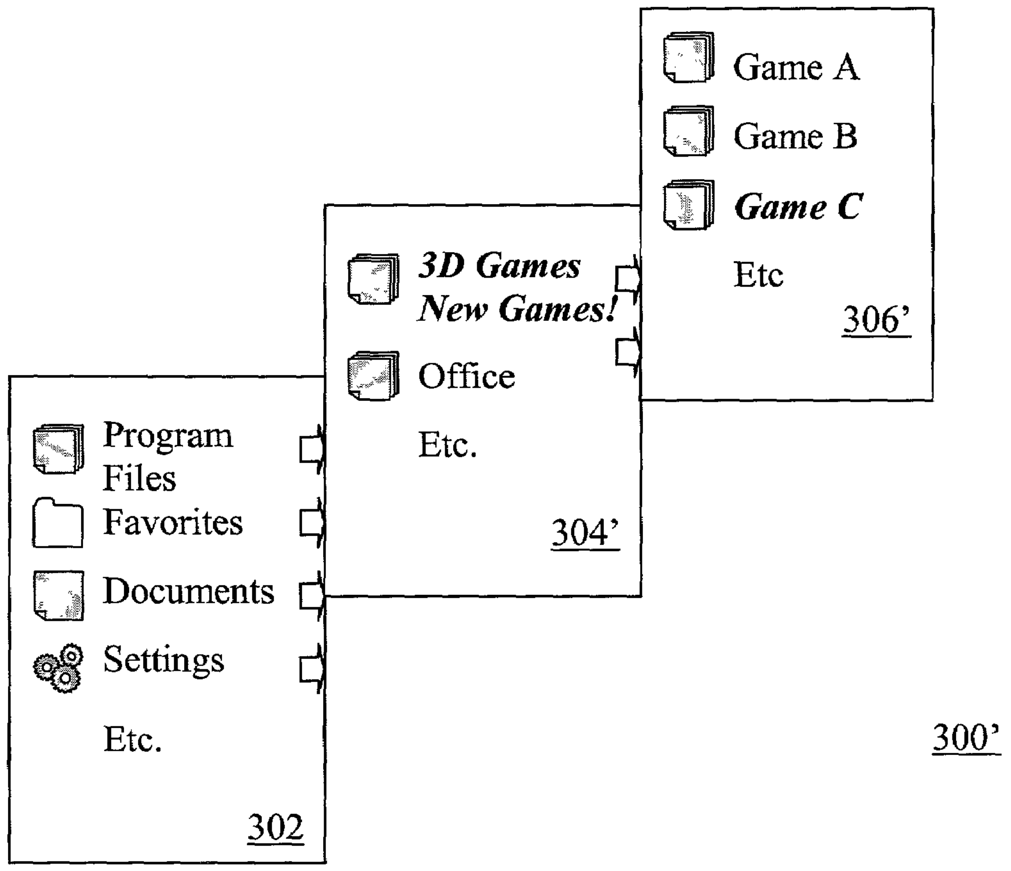

Turning now first to FIGS. 3*a*–3*b*, wherein an example application of the present invention to the provision, offering or announcement of new 3D games is illustrated. For the illustrated example, as shown in FIG. 3*a*, client 108 includes an example graphical end user interface having example menu hierarchy 300 that includes menu panes 302–306. Menu pane 302 includes menu items "Program Files", "Favorites", "Documents", and so forth. Menu pane 304, displayed in response to the selection of menu item "Program files", includes menu items "3D games", "Office", and so forth. Menu pane 306, displayed in response to the selection of menu item "3D games", includes menu items "Game A", "Game B", and so forth.

In accordance with the present invention, a 3D game provider would make available or otherwise announce the available of a new 3D game, "Game C", by sending to the client a distribution collection of sub-menu items including sub-menu item for "Game C", its visual representation, and a temporal substitute visual representation for "3D Games". For the example illustration, the "normal" visual representation of the family of 3D games is simply the title "3D Games" and an associated icon, and the temporal substitute visual representation is simply the annotated title "3D Games, New Games!" and the associated icon, to draw the user's attention. In alternate embodiments, more or less "assertive" temporal substitute visual representations may be employed for menu item to alert and/or attract the user's attention to the fact that "new" sub-menu items have been added for the menu item.

Thus, whenever the user selects menu item "Program Files" (menu pane 302) in the course of normal navigation of menu hierarchy 300', the user will be presented with the temporal substitute visual representation for the family of 3D games to draw his/her attention (menu pane 304'). If the user responds and selects the "3D Game" menu item, the user will be presented with the sub-menu items, including sub-menu item for "new" game, "Game C" (menu pane 306'). Recall that the client may actually be provided with "Game C", and the sub-menu item comprises an access path pointing to a location within a local file subsystem where "Game C" is located. Alternatively, the sub-menu item may merely correspond to an offering or announcement of "Game C", which may be locally or remotely disposed.

Note that if the user elects to ignore the transformation of the visual representation of "3D Game", and proceeds with his/her desired navigation, the user may do so without being interrupted (i.e. having to "cancel" the offer or announcement as in the prior art). Further, the offer or announcement will be available for subsequent selection until it is removed (based on an application dependent criteria). Accordingly, the user may be provided, offered or informed of the availability of "Game C" in a persistent, but relatively non-intrusive manner.

Note that the above example applies equally to the provision or announcement of service bulletins for a program product or service.

Figure 4A:
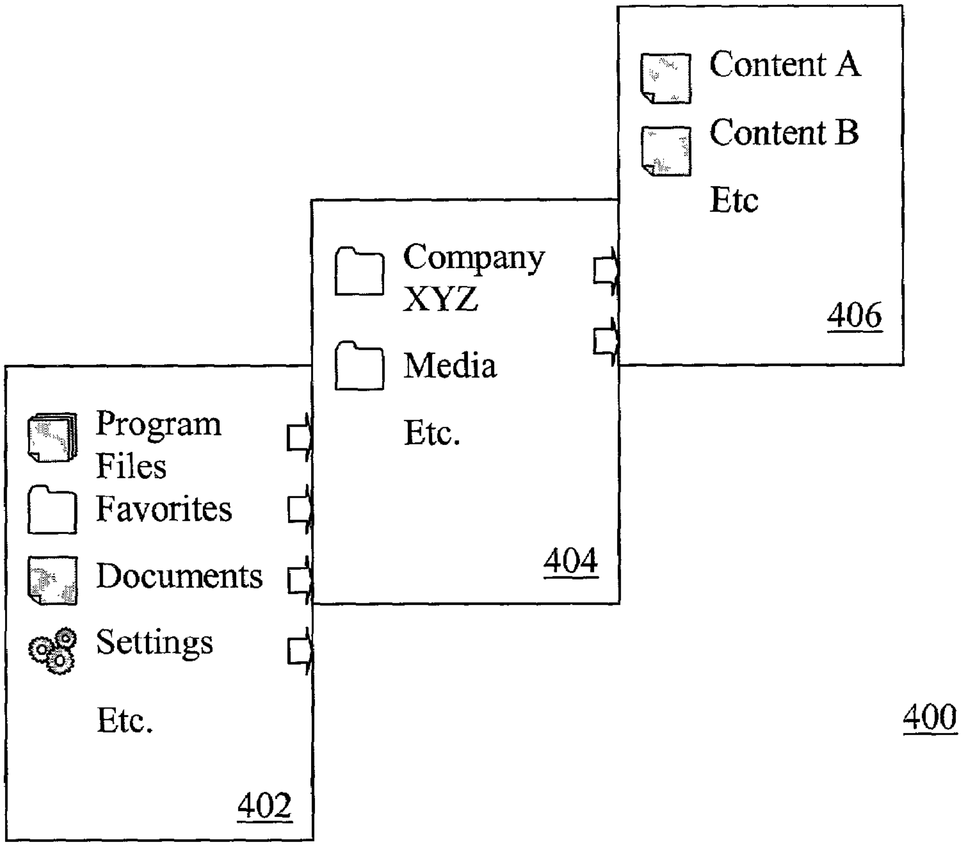
FIGS. 4*a*–4*b* illustrate an end user view of the present invention, in accordance with another application.
Figure 4B:
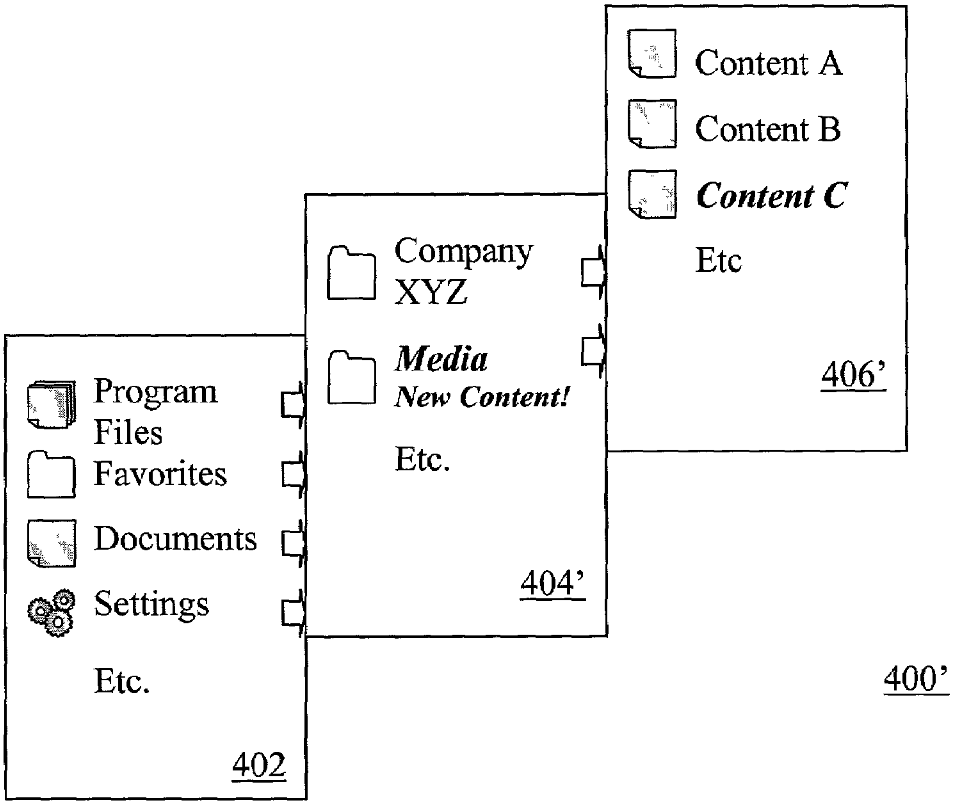

FIGS. 4*a*–4*b* illustrate another example application of the present invention to the provision, offering or announcement of media contents. Similar to the earlier example, the client 108 includes an example graphical end user interface having example menu hierarchy 400 that includes menu panes 402–406. Menu pane 402 includes menu items "Program files", "Favorites", "Documents", and so forth. Menu pane 404, displayed in response to the selection of menu item "Favorites", includes menu items "Company XYZ" (e.g. an online retailer), "Media" (e.g. media from a particular distributor, or media of a particular type, such as movies or music), and so forth. Menu pane 406, displayed in response to the selection of menu item "Media", includes menu items "Content A", "Content B", and so forth.

In accordance with the present invention, a media content provider would make available or otherwise announce the available of a "new" media content, "Content C", by sending to the client a distribution collection of sub-menu items, including sub-menu item for "Content C", its visual representation, and a temporal substitute visual representation for "Media". For the example illustration, the "normal" visual representation of the family of media is simply the title "Media" and an associated icon, and the temporal substitute visual representation is simply the annotated title "Media, New Contents!" and the associated icon, to draw the user's attention.

Thus, whenever the user selects menu item "Favorites" (menu pane 402) in the course of normal navigation of menu hierarchy 400', the user will be presented with the temporal substitute visual representation for the family of media contents to draw his/her attention. If the user responds and selects the “Media” menu item (menu pane 404'), the user will be presented with the sub-menu item for “new” content, “Content C” (menu pane 406'). Recall that the client may actually be provided with “Content C”, and the sub-menu item comprises an access path pointing to a location within a local file subsystem where “Content C” is located. Alternatively, the sub-menu item may merely correspond to an announcement of “Content C”, which may be locally or remotely disposed.

Note that if the user elects to ignore the transformation of the visual representation of “Media”, and proceeds with his/her desired navigation, the user may do so without being interrupted (i.e. having to “cancel” the offer or announcement as in the prior art). Further, the offer or announcement will be available for subsequent selection until it is removed (based on an application dependent criteria). Accordingly, the user may be provided, offered or informed of the availability of “Content C” in a persistent, but relatively non-intrusive manner.

Note that “Media” may be a “bulletin board”, and the “contents” may be the various “information posting” of the “bulletin board”. Further, the above example applies equally to “Company XYZ” in the offering and/or announcement of special offers, sales and so forth.

Figure 5A:
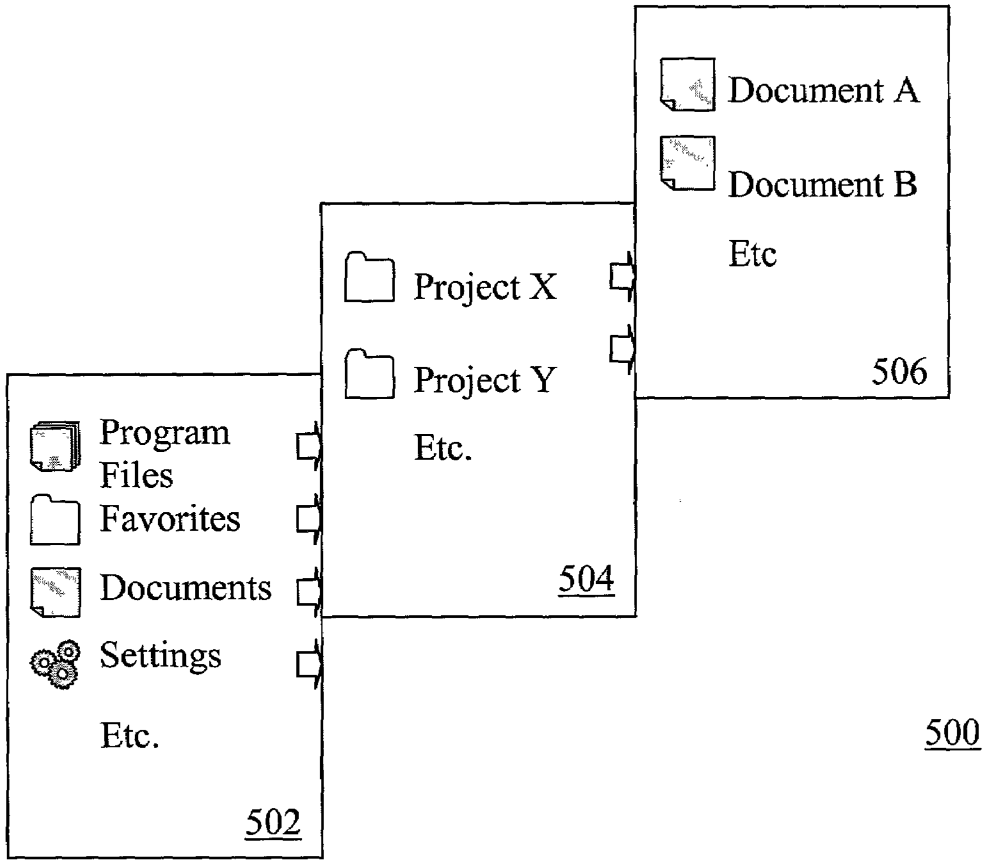
FIGS. 5*a*–5*b* illustrate an end user view of the present invention, in accordance with yet another application.
Figure 5B:
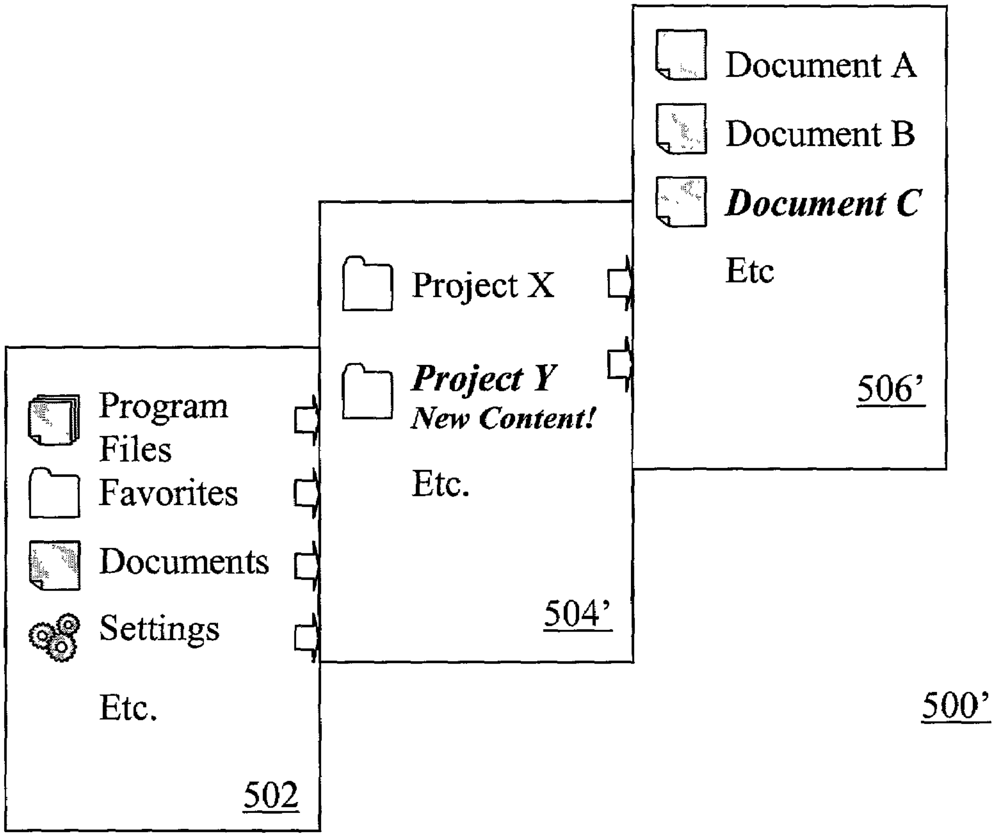

FIGS. 5*a*–5*b* illustrate another example application of the present invention to the sharing of documents in a collaboration application. Similar to the earlier example, the client 108 includes an example graphical end user interface having example menu hierarchy 500 that includes menu panes 502–506. Menu pane 502 includes menu items “Program files”, “Favorites”, “Documents”, and so forth. Menu pane 504, displayed in response to the selection of menu item “Documents”, includes menu items “Project X”, “Project Y”, and so forth. Menu pane 506, displayed in response to the selection of menu item “Project Y”, includes menu items “Document A”, “Document B”, and so forth.

In accordance with the present invention, a collaboration application would make available or otherwise announce the available of a “new” document, “Document C”, by sending to the client a distribution collection including sub-menu item for “Document C”, its visual representation, and a temporal substitute visual representation for “Project Y”. For the example illustration, the “normal” visual representation of the family of media is simply the title “Project Y” and an associated icon, and the temporal substitute visual representation is simply the annotated title “Project Y, New Documents!” and an associated icon, to draw the user’s attention.

Thus, whenever the user selects menu item “Documents” (menu pane 502) in the course of normal navigation of menu hierarchy 500', the user will be presented with the temporal substitute visual representation for the family of media contents to draw his/her attention. If the user responds and selects the “Project Y” menu item (menu pane 504'), the user will be presented with the sub-menu item for “new” content, “Document C” (menu pane 506'). Recall that the client may actually be provided with “Document C”, and the sub-menu item comprises an access path pointing to a location within a local file subsystem where “Document C” is located. Alternatively, the sub-menu item may merely correspond to an announcement of “Document C”, which may be locally or remotely disposed.

Note that if the user elects to ignore the transformation of the visual representation of “Project Y”, and proceeds with his/her desired navigation, the user may do so without being interrupted (i.e. having to “cancel” the offer or announcement as in the prior art). Further, the offer or announcement will be available for subsequent selection until it is removed (based on an application dependent criteria). Accordingly, the user may be provided, offered or informed of the availability of “Document C” in a persistent, but relatively non-intrusive manner.

Figure 6A:
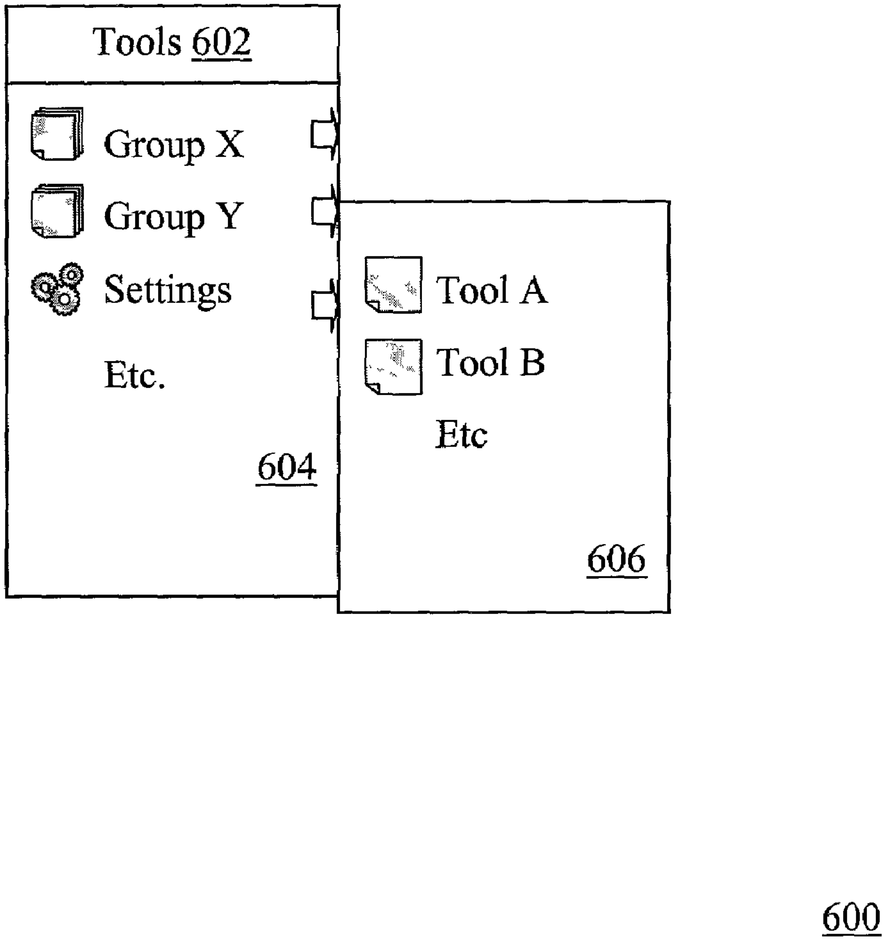
FIGS. 6*a*–6*b* illustrate an end user view of the present invention, in accordance with yet another application.
Figure 6B:
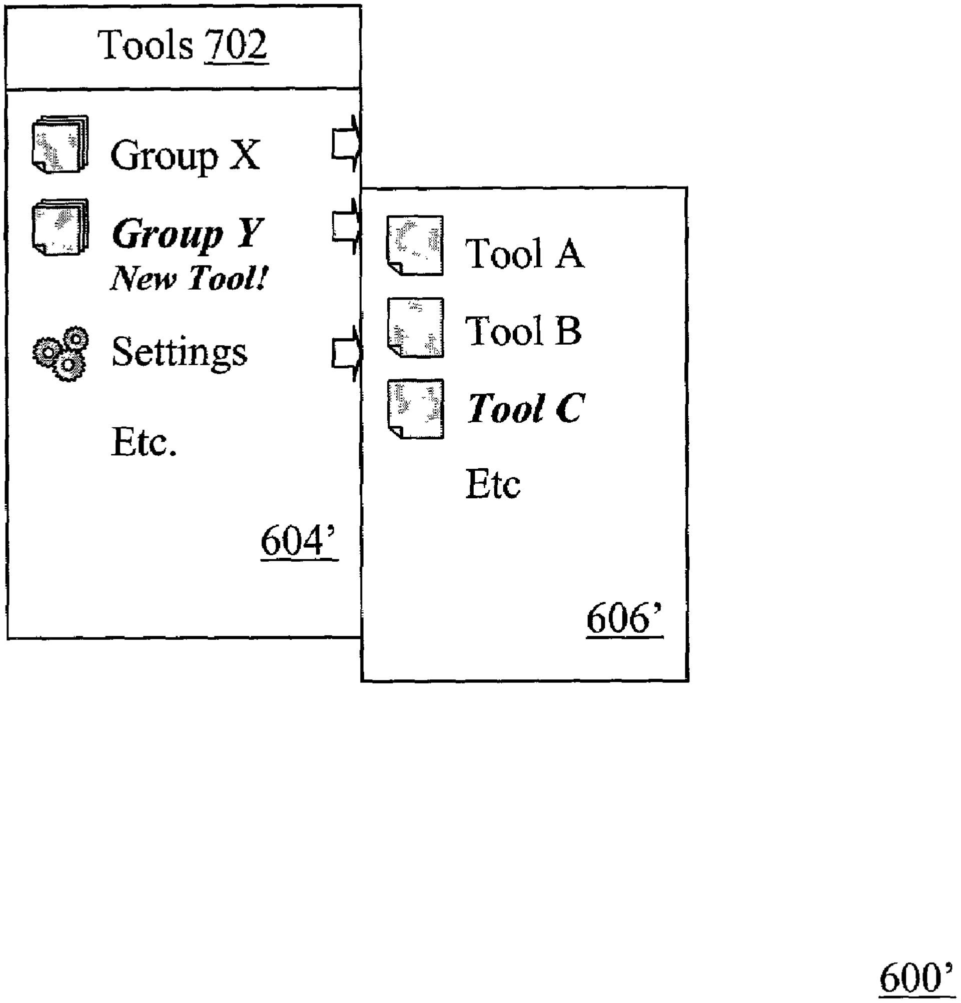

FIGS. 6*a*–6*b* illustrate yet another example application of the present invention to the provision, offering or announcement of a new tool function of an application. The application may for example be a word processing application, a spreadsheet application, an email application and so forth. Similar to the earlier example, the particular application of the client 108 includes an example graphical end user interface having example menu hierarchy 600 that includes menu button 602, and menu panes 604–606. Menu pane 604, displayed in response to the selection of menu button “Tools” 602, includes menu items for tools “Group X”, “Group Y”, and so forth. Menu pane 606, displayed in response to the selection of the menu item for tools “Group Y”, includes menu items “Tool A”, “Tool B”, and so forth.

In accordance with the present invention, the application provider would make available or otherwise announce the available of a “new” tool, “Tool C”, by sending to the client a distribution collection of sub-menu items, including sub-menu item for “Tool C”, its visual representation, and a temporal substitute visual representation for “Group Y”. For the example illustration, the “normal” visual representation of the family of tools is simply the title “Group Y” and its associated icon, and the temporal substitute visual representation is simply the annotated title “Group Y, New Tools!” and its associated icon, to draw the user’s attention.

Thus, whenever the user selects menu button “Tools” 602 in the course of normal navigation of menu hierarchy 600', the user will be presented with the temporal substitute visual representation for the family of tools “Group Y” to draw his/her attention. If the user responds and selects the tools “Group Y” menu item (menu pane 604'), the user will be presented with the sub-menu item for “new” tool, “Tool C” (menu pane 606'). Recall that the client may actually be provided with “Tool C”, and the sub-menu item comprises an access path pointing to a location within a local file subsystem where “Tool C” is located. Alternatively, the sub-menu item may merely correspond to an announcement of “Tool C”, which may be locally or remotely disposed.

Note that if the user elects to ignore the transformation of the visual representation of tools “Group Y”, and proceeds with his/her desired navigation, the user may do so without being interrupted (i.e. having to “cancel” the offer or announcement as in the prior art). Further, the offer or announcement will be available for subsequent selection until it is removed (based on an application dependent criteria). Accordingly, the user may be provided, offered or informed of the availability of “Tool C” in a persistent, but relatively non-intrusive manner.

For ease of understanding, each of the above examples has been illustrated with the menu item being located at the “second” shown level of the menu hierarchy and the sub-menu items located at the “third” shown level of the menu hierarchy. However, as those skilled in the art would readily appreciate, the present invention is not so restricted, and the present invention may be practiced with the menu and sub-menu items located at any two levels of a menu hierarchy.

EXAMPLE COMPUTER SYSTEM

Figure 7:
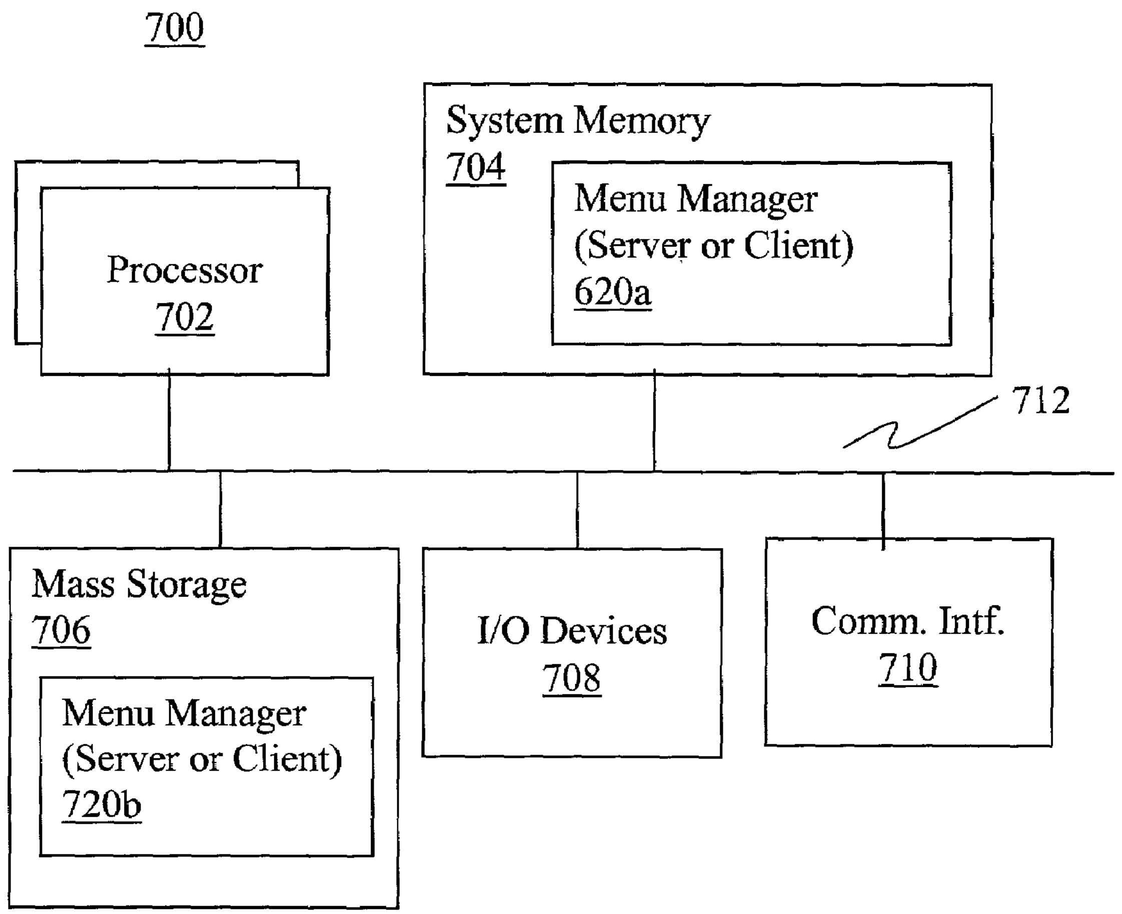
FIG. 7 illustrates an example computer system suitable for use to practice the present invention, in accordance with one embodiment.

FIG. 7 illustrates an example computer system suitable for use as a server or a client to practice the present invention, in accordance with one embodiment. As shown, computer system 700 includes one or more processors 702 and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements performs its conventional functions known in the art. In particular, system memory 704 and mass storage 706 are employed to store a working copy and a permanent copy of the programming instructions implementing the menu manager (the server side or the client side) of the present invention. The permanent copy of the programming instructions may be loaded into mass storage 706 in the factory, or in the field, as described earlier, through a distribution medium (not shown) or through communication interface 710 (from a distribution server (not shown). The constitution of these elements 702–712 are known, and accordingly will not be further described.

CONCLUSION AND EPILOGUE

Thus, it can be seen from the above descriptions, a novel method and apparatus for a server to communicate or transact with a client has been described. The novel method/apparatus is advantageously persistent and relatively non-intrusive. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a client device, a method of operation comprising:

receiving from a remote server a distribution collection of sub-menu items for a menu item;

determining whether one or more of the sub-menu items of said distribution collection are not part of an operational collection of sub-menu items of the menu item;

updating the operational collection of sub-menu items of the menu item; and changing an operational visual representation of the menu item from a first state to a second state to convey to a user of the client device that new sub-menu items have been added to the operational collection of sub-menu items of the menu item.

2. The method of claim 1, wherein said updating of the operational collection of sub-menu items of the menu item comprises adding said one or more of the sub-menu items of said distribution collection that are not part of said operational collection of sub-menu items of the menu item to the operational collection of sub-menu items of the menu item.

3. The method of claim 1, wherein said first state of the operational visual representation of the menu item comprises a description of the menu item, and said changing of the operational visual representation of the menu item from the first state to the second state comprises changing said operational visual representation of the menu item comprising said description of the menu item to an operational visual representation of the menu item comprising said description of the menu item annotated with an indication that one or more sub-menu items have been added to the operational collection of sub-menu items of the menu item.

4. The method of claim 1, wherein the method further comprises responsive to an occurrence of a predetermined condition, changing said operational visual representation of the menu item from said second state back to said first state.

5. The method of claim 4, wherein said predetermined condition comprises a user having selected a predetermined number of at least one or more added sub-menu items.

6. The method of claim 1, wherein said menu item corresponds to a family of program products, said sub-menu items correspond to program products of the family, and said one or more sub-menu items that are not part of the operational collection of sub-menu items of the menu item correspond to newly available program products of the family or newly available versions of the program products of the family.

7. The method of claim 6, wherein the family of program products is 3D computer games, and each of the program products is a 3D computer game.

8. The method of claim 1, wherein said menu item corresponds to a family of media contents, said sub-menu items correspond to media contents of the family, and said one or more sub-menu items that are not part of the operational collection of sub-menu items of the menu item correspond to newly available media contents of the family or newly available versions of the media contents of the family.

9. The method of claim 8, wherein the family of media contents is a bulletin board of information postings, and each of media contents is an information posting.

10. The method of claim 1, wherein said menu item corresponds to a family of documents, said sub-menu items correspond to documents of the family, and said one or more sub-menu items that are not part of the operational collection of sub-menu items of the menu item correspond to newly available documents of the family or newly available versions of the documents of the family.

11. The method of claim 1, wherein one or more sub-menu items comprise locators identifying locations from which resources to which the one or sub-menu items correspond can be retrieved.

12. The method of claim 11, wherein said locations are disposed within a local file subsystem, and the method further comprises receiving said resources into said locations of said file subsystem from a selected one of said remote server or an agent of said remote server.

13. The method of claim 11, wherein said resources comprise selected ones of executable, text files and web pages.

14. An apparatus comprising:

storage medium having stored therein a plurality of programming instructions designed to implement a menu management function, when executed, enables the apparatus to receive from a remote server a distribution collection of sub-menu items for a menu item, determine whether one or more of the sub-menu items of said distribution collection are not part of an operational collection of sub-menu items of the menu item, update the operational collection of sub-menu items of the menu item, and change an operational visual representation of the menu item from a first state to a second state to convey to a user of the apparatus that new sub-menu items have been added to the operational collection of sub-menu items of the menu item; and at least one processor coupled to the storage medium to execute the programming instructions.

15. The apparatus of claim 14, wherein said menu management function enables said apparatus to update the operational collection of sub-menu items of the menu item by adding said one or more of the sub-menu items of said distribution collection that are not part of said operational collection of sub-menu items of the menu item to the operational collection of sub-menu items of the menu item.

16. The apparatus of claim 14, wherein said first state of the operational visual representation of the menu item comprises a description of the menu item, and said menu management function enables said apparatus to change the operational visual representation of the menu item from the first state to the second state by changing said operational visual representation of the menu item comprising said description of the menu item to an operational visual representation of the menu item comprising said description of the menu item annotated with an indication that one or more sub-menu items have been added to the operational collection of sub-menu items of the menu item.

17. The apparatus of claim 14, wherein said menu management function further enables said apparatus to change said operational visual representation of the menu item from said second state back to said first state, responsive to an occurrence of a predetermined condition.

18. The apparatus of claim 14, wherein said menu item corresponds to a family of program products, said sub-menu items correspond to program products of the family, and said one or more sub-menu items that are not part of the operational collection of sub-menu items of the menu item correspond to newly available program products of the family or newly available versions of the program products of the family.

19. The apparatus of claim 14, wherein said menu item corresponds to a family of media contents, said sub-menu items correspond to media contents of the family, and said one or more sub-menu items that are not part of the operational collection of sub-menu items of the menu item correspond to newly available media contents of the family or newly available versions of the media contents of the family.

20. The apparatus of claim 14, wherein said menu item corresponds to a family of documents, said sub-menu items correspond to documents of the family, and said one or more sub-menu items that are not part of the operational collection of sub-menu items of the menu item correspond to newly available documents of the family or newly available versions of the documents of the family.

21. The apparatus of claim 14, wherein one or more sub-menu items comprise locators identifying locations from which resources to which the one or sub-menu items correspond can be retrieved.

22. A method comprising:

installing a first version of a first resource on an apparatus;

installing also on said apparatus a first sub-menu item corresponding to the first version of the first resource; and installing further on said apparatus an agent to facilitate subsequent installing on said apparatus a second sub-menu item corresponding to a selected one of a second version of the first resource and a third version of a second resource, and to facilitate modification of a visual representation of a menu item of said apparatus to which at least one or multiple sub-menu items are members, to draw an user's attention to said second sub-menu item.

23. The method of claim 22, wherein said agent facilitates modification of said visual representation of said menu item of said apparatus to which at least one or multiple sub-menu items are members by facilitating modification of said visual representation of said menu item from a first state to a second state, and said agent further facilitates restoration of said visual representation of said menu item back to said first state responsive to an occurrence of a pre-determined condition.

24. The method of claim 23, wherein at least one of said resources is a selected one of an executable and a media content.

25. An apparatus comprising:

storage medium having stored therein a plurality of programming instructions, when executed, install a first version of a first resource on said apparatus, install within a menu hierarchy of said apparatus a first sub-menu item corresponding to the first version of the first resource, and install an agent on said apparatus to facilitate subsequent installation of a second sub-menu item corresponding to a selected one of a second version of the first resource and a third version of a second resource, and to facilitate modification of a visual representation of a menu item of said menu hierarchy to which at least one or multiple sub-menu items are members, to draw an user's attention to said second sub-menu item; and at least one processor coupled to the storage medium to execute the programming instructions.

26. The apparatus of claim 25, wherein said agent facilitates modification of said visual representation of said menu item to which at least one or multiple sub-menu items are members by facilitating modification of said visual representation of said menu item from a first state to a second state, and said agent further facilitates restoration of said visual representation of said menu item back to said first state responsive to an occurrence of a pre-determined condition.

27. The apparatus of claim 25, wherein at least one of said resources is a selected one of an executable and a media content.

28. A server apparatus comprising:

storage medium having stored therein a plurality of programming instructions, when executed, install a first version of a first resource on a client apparatus, install within a menu hierarchy of said client apparatus a first sub-menu item corresponding to the first version of the first resource, and install an agent on said client apparatus to facilitate subsequent installation of a second sub-menu item corresponding to a selected one of a second version of the first resource and a third version of a second resource, and to facilitate modification of a visual representation of a menu item of said menu hierarchy to which at least one or multiple sub-menu items are members, to draw an user's attention to said second sub-menu item; and at least one processor coupled to the storage medium to execute the programming instructions.

29. The apparatus of claim 28, wherein said agent facilitates modification of said visual representation of said menu item to which at least one or multiple sub-menu items are members by facilitating modification of said visual representation of said menu item from a first state to a second state, and said agent further facilitates restoration of said visual representation of said menu item back to said first state responsive to an occurrence of a pre-determined condition.

30. The apparatus of claim 28, wherein at least one of said resources is a selected one of an executable and a media content.

31. A method comprising:

installing a first version of a first game software on an apparatus;

installing also on said apparatus a first sub-menu item corresponding to the first version of the first game software; and installing further on said apparatus an agent to facilitate subsequent installing on said apparatus a second sub-menu item corresponding to a selected one of a second version of the first game software and a third version of a second game software, and to facilitate modification of a visual representation of a menu item to which the sub-menu items are members, to draw an user's attention to said second sub-menu item.

32. The method of claim 31, wherein said agent facilitates modification of said visual representation of said menu item to which the sub-menu items are members by facilitating modification of said visual representation of said menu item from a first state to a second state, and said agent further facilitates restoration of said visual representation of said menu item back to said first state responsive to an occurrence of a pre-determined condition.

33. An apparatus comprising:

storage medium having stored therein a plurality of programming instructions, when executed, install a first version of a first game software on said apparatus, install within a menu hierarchy of said apparatus a first sub-menu item corresponding to the first version of the first game software, and install an agent on said apparatus to facilitate subsequent installation of a second sub-menu item corresponding to a selected one of a second version of the first game software and a third version of a second game software, and to facilitate modification of a visual representation of a menu item of said menu hierarchy to which the sub-menu items are members, to draw an user's attention to said second sub-menu item; and at least one processor coupled to the storage medium to execute the programming instructions.

34. The apparatus of claim 33, wherein said agent facilitates modification of said visual representation of said menu item to which the sub-menu items are members by facilitating modification of said visual representation of said menu item from a first state to a second state, and said agent further facilitates restoration of said visual representation of said menu item back to said first state responsive to an occurrence of a pre-determined condition.

35. A server apparatus comprising:

storage medium having stored therein a plurality of programming instructions, when executed, install a first version of a first game software on a client apparatus, install within a menu hierarchy of said client apparatus a first sub-menu item corresponding to the first version of the first game software, and install an agent on said client apparatus to facilitate subsequent installation of a second sub-menu item corresponding to a selected one of a second version of the first game software and a third version of a second game software, and to facilitate modification of a visual representation of a menu item of said menu hierarchy to which the sub-menu items are members, to draw an user's attention to said second sub-menu item; and at least one processor coupled to the storage medium to execute the programming instructions.

36. The server apparatus of claim 35, wherein said agent facilitates modification of said visual representation of said menu item to which the sub-menu items are members by facilitating modification of said visual representation of said menu item from a first state to a second state, and said agent further facilitates restoration of said visual representation of said menu item back to said first state responsive to an occurrence of a pre-determined condition.

* * * * *

UNITED STATES PATENT AND TRADEMARK OFFICE

CERTIFICATE OF CORRECTION

PATENT NO. : 7,111,249 B2
APPLICATION NO. : 09/901560
DATED : September 19, 2006
INVENTOR(S) : Jeremy A. Kenyon It is certified that error appears in the above-identified patent and that said Letters Patent is hereby corrected as shown below:

Column 1
Line 18, "... increasingly, software, content..." should read --... increasingly, software content…--.
Line 45, "...for examples, some..." should read --...for example, some…--.

Column 2
Line 27, "... more relatively more..." should read --... relatively more…--.

Column 3
Line 22, "... including but are not limited..." should read --...including but not limited…--.
Line 29, "...including but are not limited..." should read --...including but not limited…--.
Line 43, "...relatively non-intrusive..." should read --...relatively non-intrusively…--.

Column 4
Line 5, "...are by definitions..." should read --...are by definition…--.
Line 6, "...of itself is a..." should read --...of itself be a…--.
Line 10, "...their trial out versions..." should read --...their trial versions…--.
Line 13, "...their trial out versions..." should read --...their trial versions…--.

Column 5
Line 65, "...available of a..." should read --...availability of a…--.

Column 6
Line 55, "...available of a..." should read --...availability of a…--.

Column 7
Line 41, "...available of a..." should read --...availability of a…--.

Column 8
Line 26, "...available of a..." should read --...availability of a…--.

UNITED STATES PATENT AND TRADEMARK OFFICE

CERTIFICATE OF CORRECTION

PATENT NO. : 7,111,249 B2
APPLICATION NO. : 09/901560
DATED : September 19, 2006
INVENTOR(S) : Jeremy A. Kenyon It is certified that error appears in the above-identified patent and that said Letters Patent is hereby corrected as shown below:

Column 9
Line 25, "...710 (from a distribution server (not shown)." should read --...710 from a distribution server (not shown).--

Signed and Sealed this

Twenty-sixth Day of June, 2007

JON W. DUDAS
*Director of the United States Patent and Trademark Office*